United States Patent [19]

Finegold et al.

[11] Patent Number: 4,677,334
[45] Date of Patent: Jun. 30, 1987

[54] FLAT COIL DYNAMOELECTRIC DEVICE WITH ENCAPSULATED PREFORM

[75] Inventors: Hyman B. Finegold, Dayton; Patrick A. Dolgas, Milford, both of Ohio

[73] Assignee: The Globe Tool and Engineering Company, Dayton, Ohio

[21] Appl. No.: 883,457

[22] Filed: Jul. 8, 1986

Related U.S. Application Data

[63] Continuation of Ser. No. 650,409, Sep. 13, 1984.

[51] Int. Cl.⁴ .......................................... H02K 15/04
[52] U.S. Cl. ..................................... 310/268; 29/598; 310/43; 310/208
[58] Field of Search .................. 310/42, 43, 45, 194, 310/208, 267, 268, 266, 179, 194, 198, 203, 234, 237; 29/598, 735; 242/713

[56] References Cited

U.S. PATENT DOCUMENTS

| Re. 27,893 | 1/1974 | Miller | 310/234 |
| 229,191 | 6/1880 | Seeley | 310/268 |
| 271,928 | 2/1883 | Seeley . | |
| 295,534 | 3/1884 | Frick | 310/268 |
| 459,610 | 9/1891 | Desroziers | 310/268 |
| 494,042 | 3/1893 | Thomas | 310/203 |
| 534,953 | 2/1895 | Eickemeyer . | |
| 3,524,250 | 8/1970 | Burr | 29/597 |
| 3,524,251 | 8/1970 | Burr | 29/598 |
| 3,525,008 | 8/1970 | Burr | 310/268 |
| 3,534,469 | 10/1970 | Keogh | 310/268 |
| 3,550,645 | 12/1970 | Keogh | 140/92.2 |
| 3,558,947 | 1/1971 | Burr | 310/154 |
| 3,575,624 | 4/1971 | Keogh | 310/268 |
| 3,599,325 | 8/1971 | Burr et al. | 29/597 |
| 3,599,680 | 8/1971 | Burr | 140/92.2 |
| 3,678,314 | 7/1972 | Carter | 310/268 |
| 3,705,459 | 12/1972 | Biddison | 29/597 |
| 3,790,835 | 2/1974 | Takeda | 310/268 |
| 3,834,014 | 9/1974 | Burr et al. | 29/598 |
| 3,863,336 | 2/1975 | Noto et al. | 29/597 |
| 3,906,622 | 9/1975 | Sakano et al. | 29/597 |
| 3,913,220 | 10/1975 | Miller | 29/597 |
| 3,922,574 | 11/1975 | Whiteley | 310/156 |
| 3,973,738 | 8/1976 | Miller | 242/7.05 B |
| 3,979,620 | 9/1976 | Whiteley | 310/263 |
| 3,997,806 | 12/1976 | Noto et al. | 310/268 |
| 4,068,143 | 1/1978 | Whiteley | 310/268 |
| 4,335,856 | 6/1982 | Fuzita | 242/7.05 B |
| 4,420,875 | 12/1983 | Coquillart | 310/268 |
| 4,549,583 | 10/1985 | Orikasa . | |

FOREIGN PATENT DOCUMENTS 0072538 2/1983 European Pat. Off. .
0174870 9/1986 European Pat. Off. .
1283290 12/1960 France .

Primary Examiner—Patrick R. Salce
Assistant Examiner—D. L. Rebsch
Attorney, Agent, or Firm—Roger S. Dybvig

[57] ABSTRACT

A discoidal, flat coil armature for a flat disc motor is formed by winding coils of wire on mutually spaced inner and outer ring structures. The inner ring structure surrounds a commutator body having segments with tangs. Automatic apparatus, including a rotating flier, a preform clamp and rotator, and a wire guide assembly, winds the coils and makes coil terminal connections to the commutator tangs before, during, and after the winding of the coils. The coils are tightly wound on the ring structures so that they form, along with the ring structures and the commutator body, an armature preform having a self-supporting shape. The parts of the finished preform are bonded together and to an armature shaft by a matrix of resinous material. When completed, the armature includes a thin-walled, active coil section having substantially radially extending active coil sides encapsulated in plastic and located between the inner and the outer ring structures, and also includes inner and outer coil end turns that are also encapsulated in plastic and that extend substantially circumferentially along the inner and the outer ring structures.

23 Claims, 27 Drawing Figures

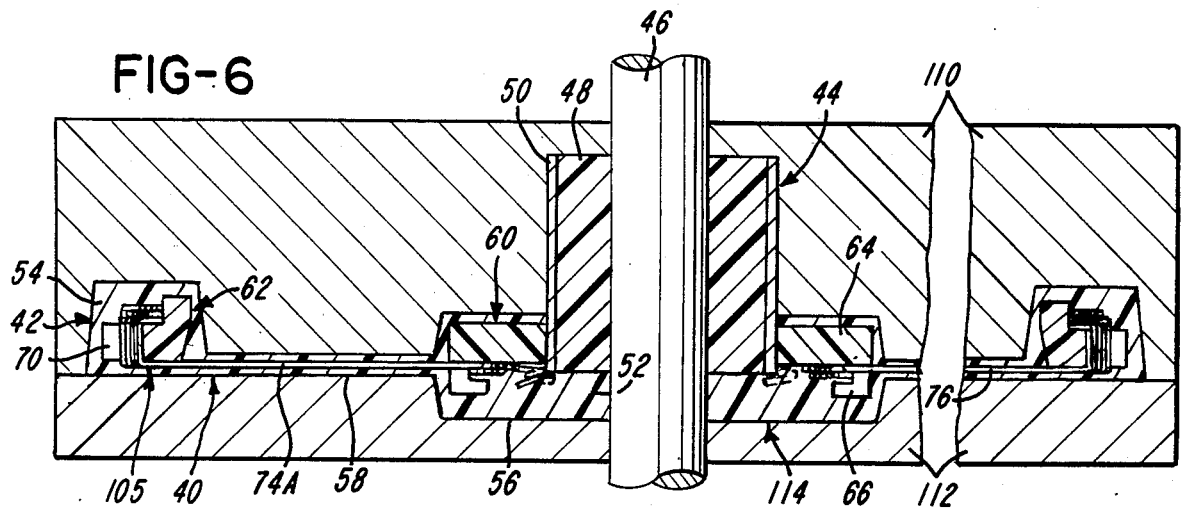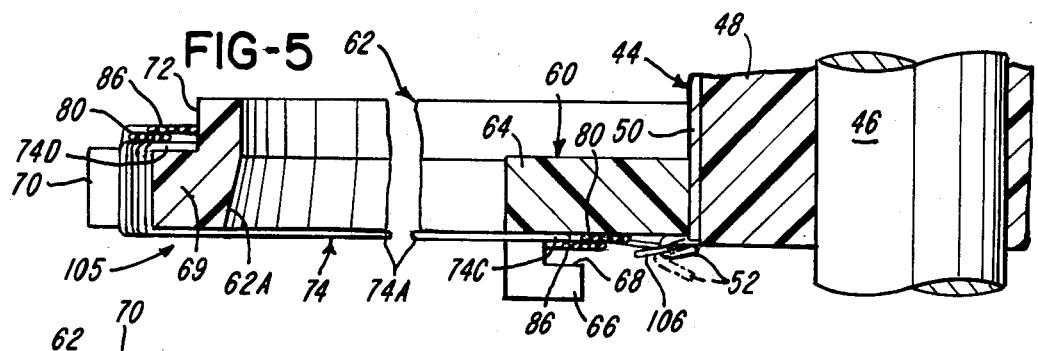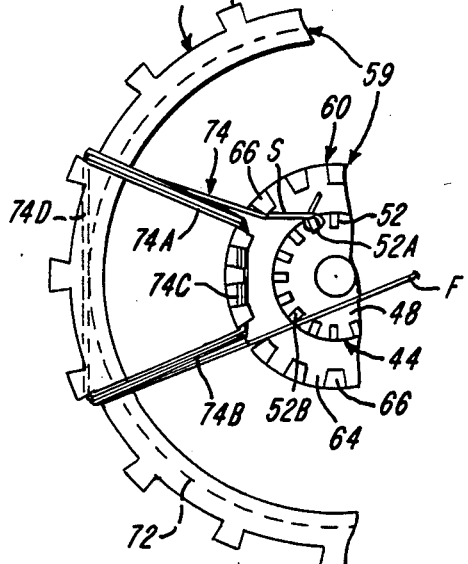

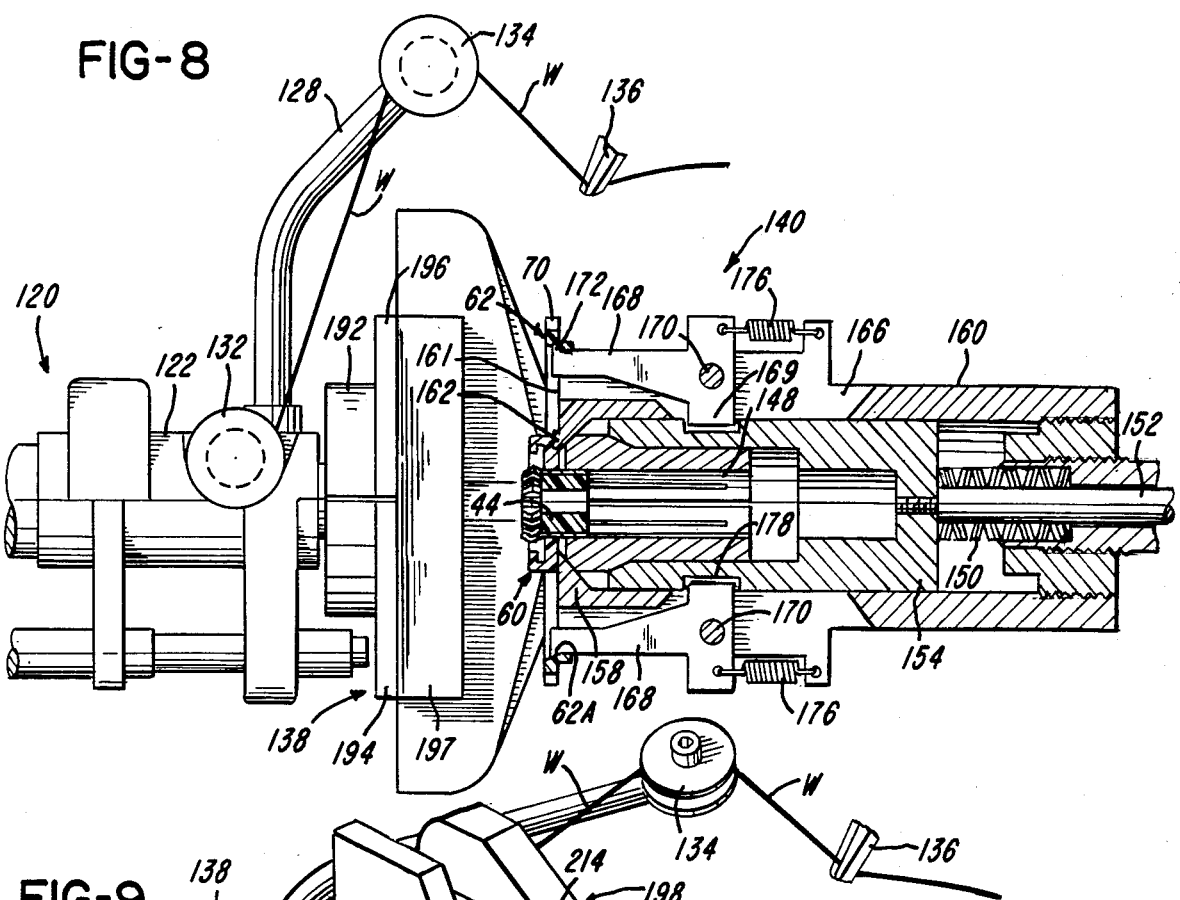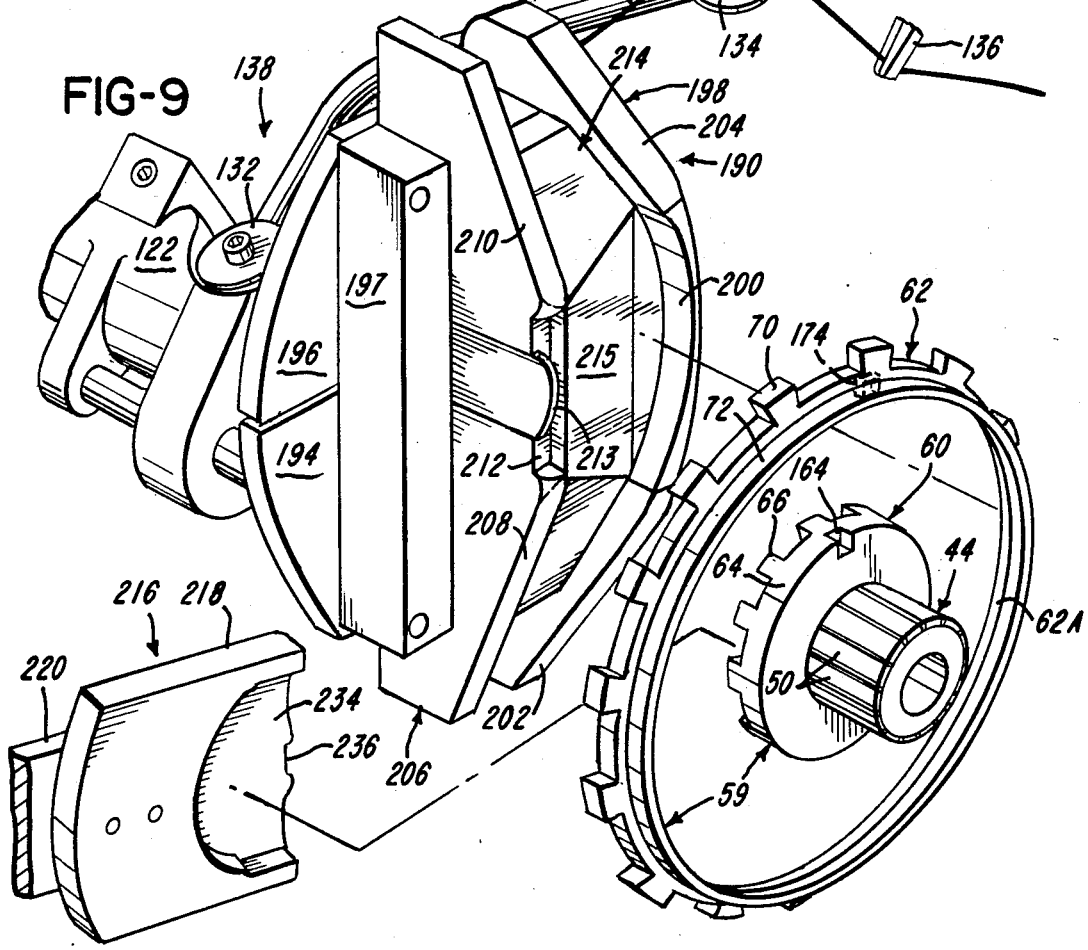

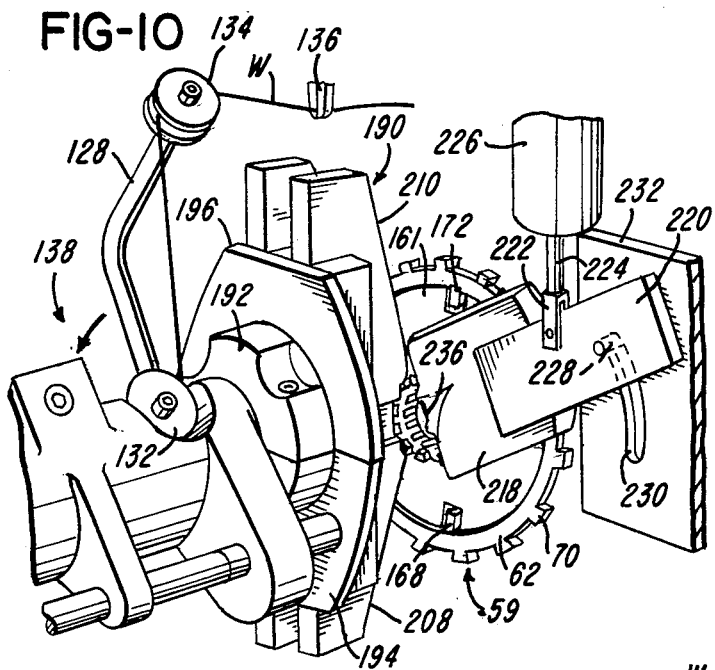
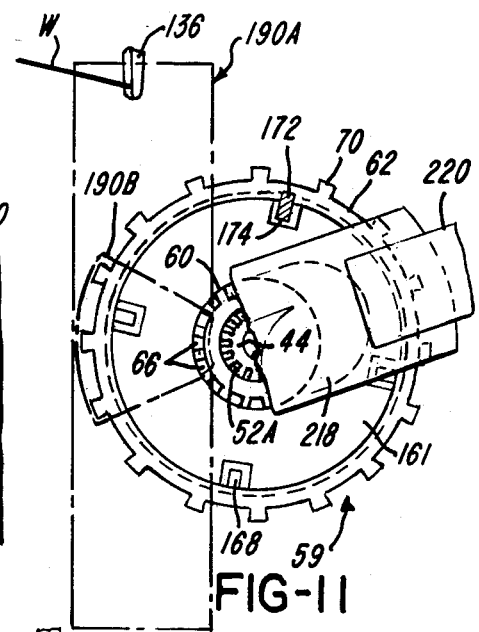
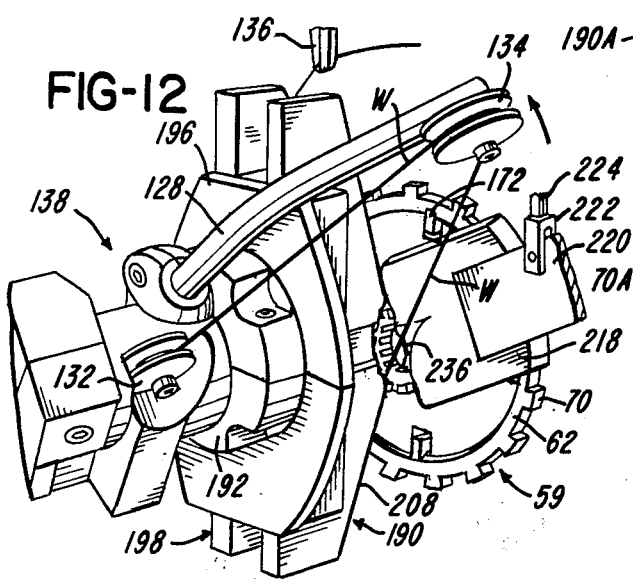
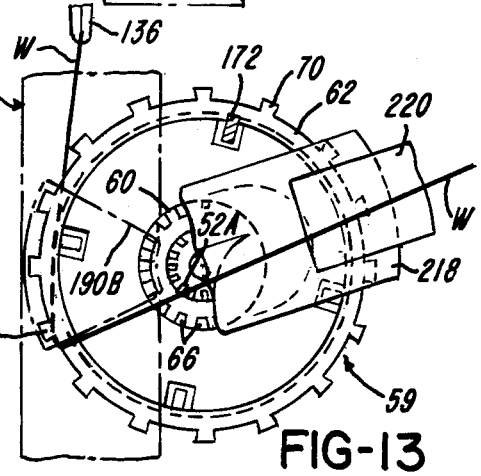
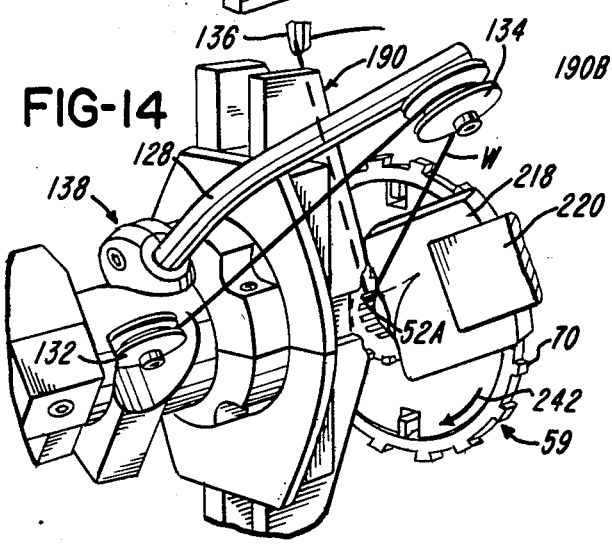
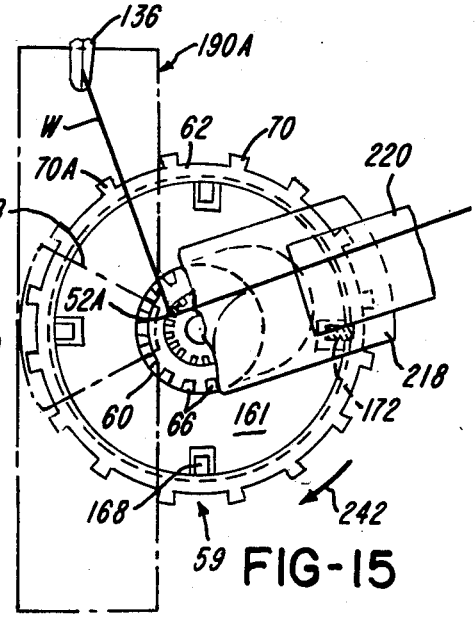

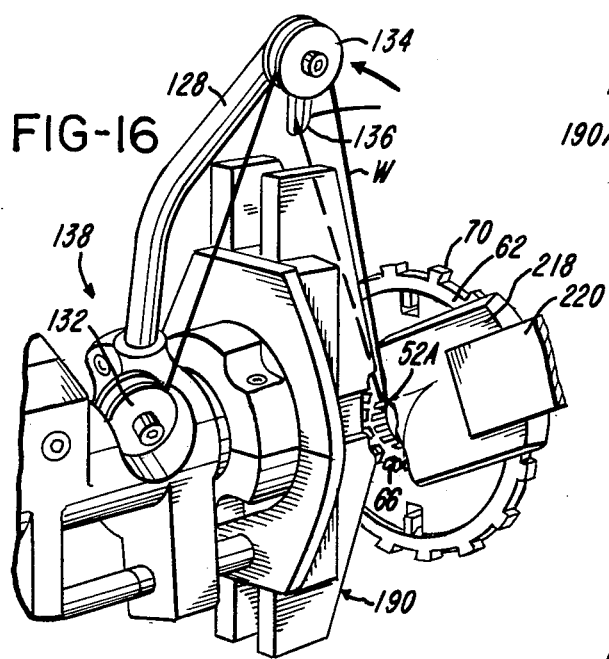
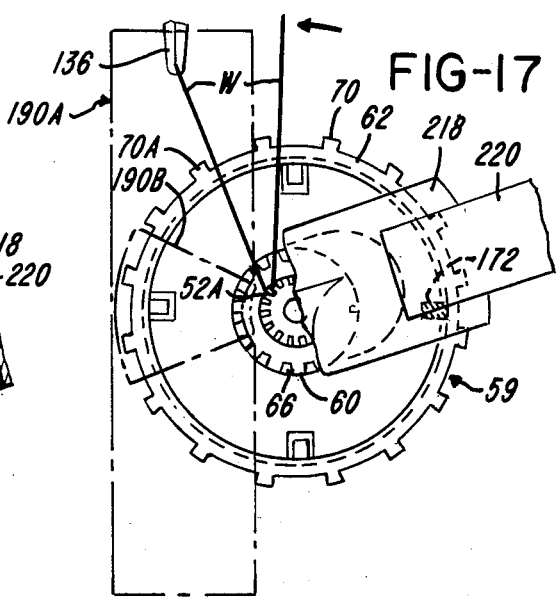
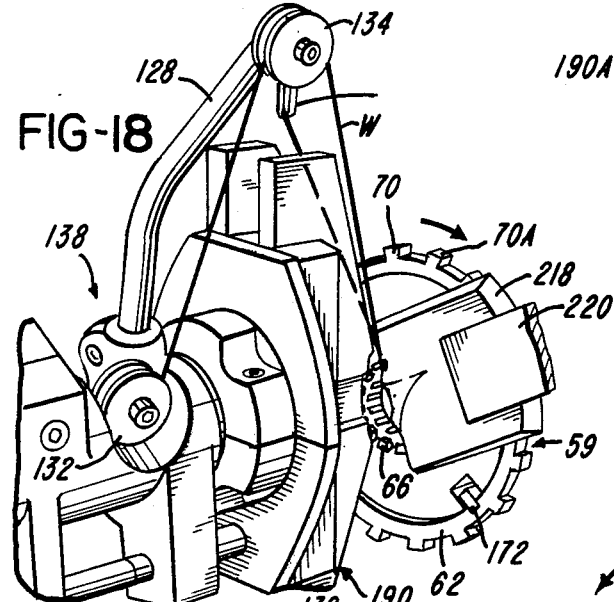
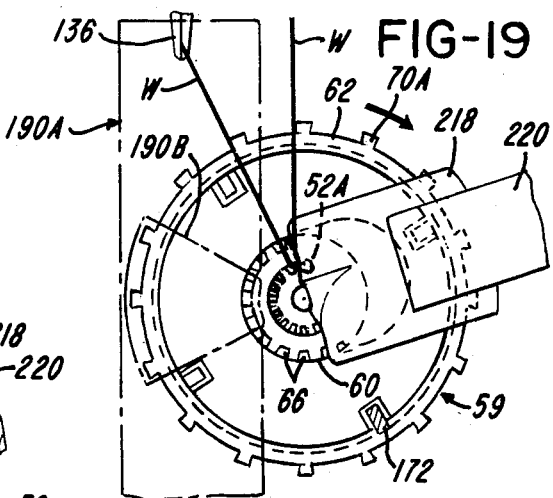
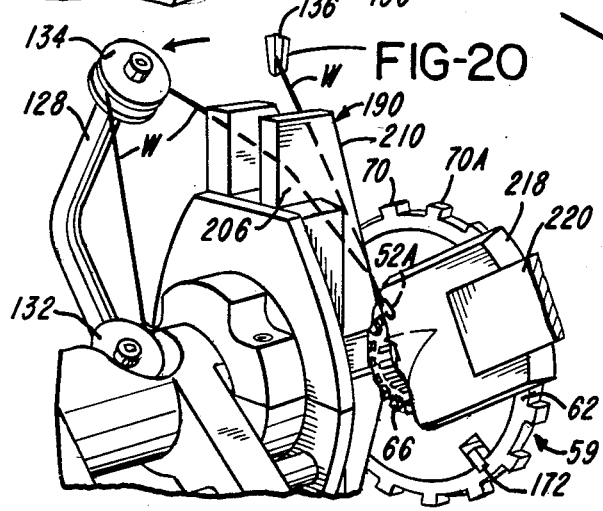
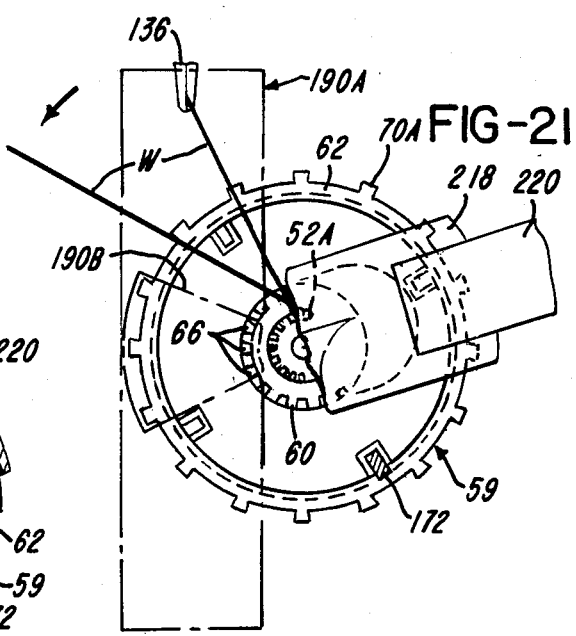

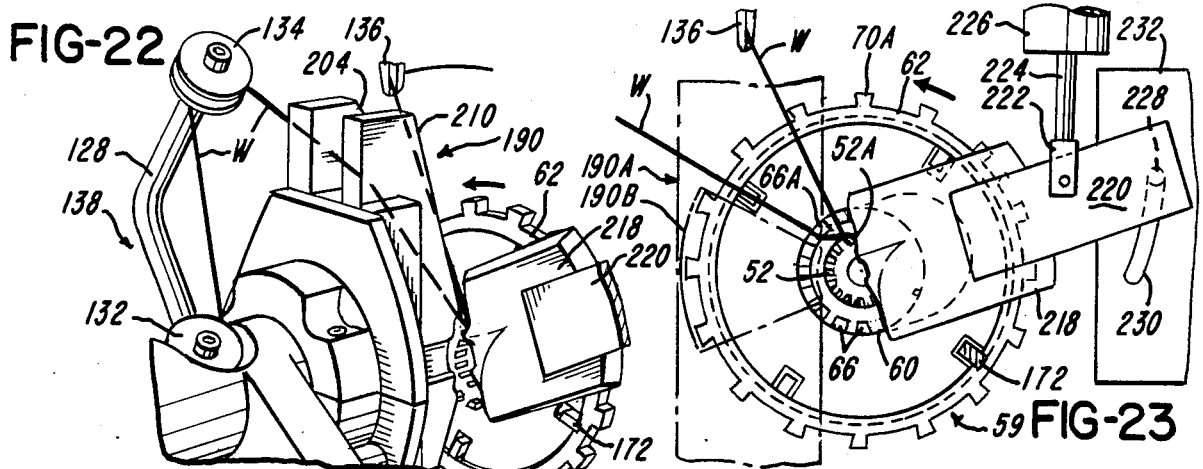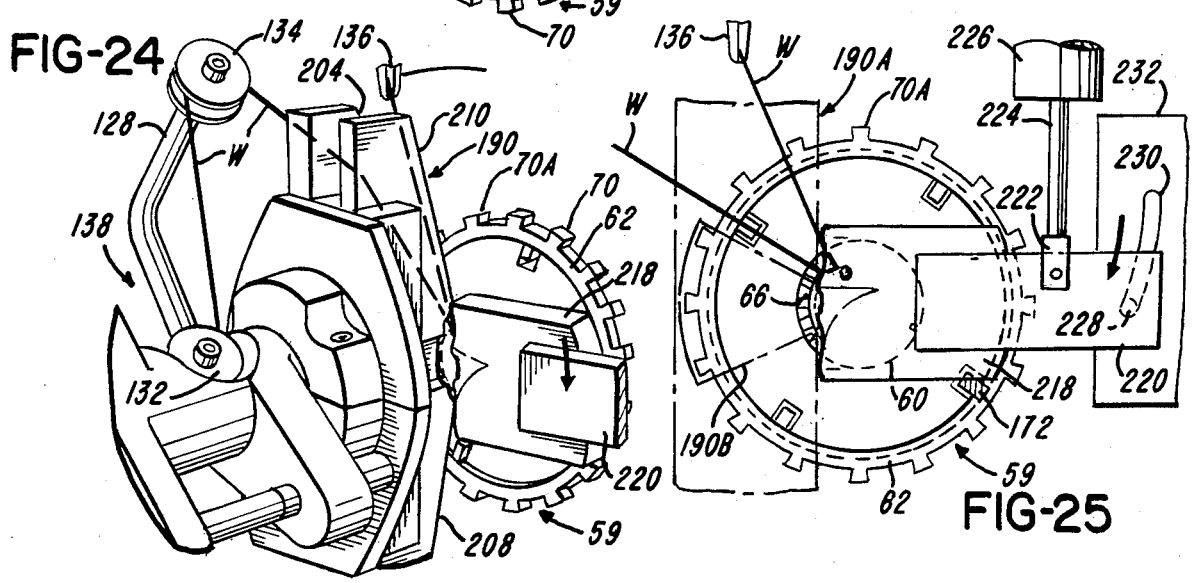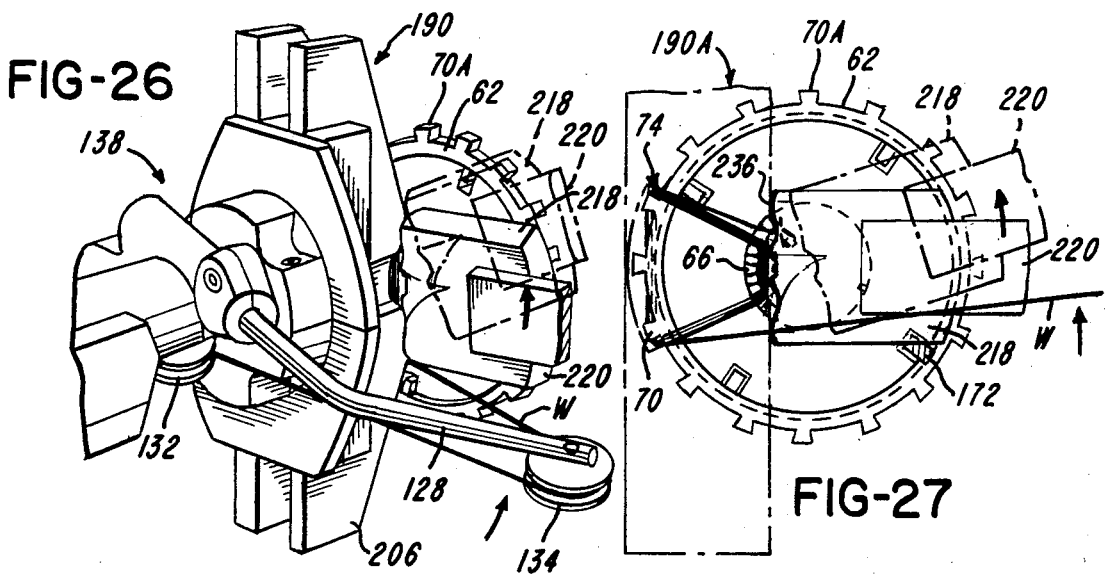

FLAT COIL DYNAMOELECTRIC DEVICE WITH ENCAPSULATED PREFORM

This is a continuation of application Ser. No. 650409, filed Sept. 13, 1984.

SUMMARY OF THE INVENTION

This invention relates to a flat coil dynamoelectric device and to a method for manufacturing the same. More particularly, this invention is concerned with a discoidal armature of the type comprising plural, flat coils wound from insulated wire, the armature having a thin walled, flat annular active coil section surrounding a center structure, including a commutator to which the several coils are connected. Those familiar with the art will recognize that the invention is not necessarily so limited. For example, certain aspects of the invention could apply to the manufacture of dynamoelectric devices, such as field members, which do not include a commutator.

Many approaches have been used to manufacture flat coil dynamoelectric devices, but the known techniques require the use of time-consuming and expensive manual steps and/or the use of elaborate and extensive equipment for winding and thereafter handling the coils as needed to form the completed devices.

An object of this invention is to simplify and thereby reduce the cost of manufacturing flat coil dynamoelectric devices. To this end, a dynamoelectric device of this invention is produced by first constructing a preform by winding coils of wire onto a preform frame comprising spaced, coaxial inner and outer frame members. The frame members are each of a solid or unitary construction having a self-supporting shape. Preferably, the coils are so wound that their inner and outer end turns substantially overlie the inner and the outer frame members, respectively, and securely engage surfaces thereof; the coil sides extend substantially radially to the common axis of the frame members; and the coil sides span between the two frame members. The coils are wound under sufficient tension, and the frame members built to withstand such tension, that the completed preform comprises a self-supporting body which may be handled by automatic materials handling equipment in essentially the same manner it would be handled if it were a solid piece. Upon completion of the preform, it is encapsulated in a matrix of resinous material to form the completed dynamoelectric device.

Another object of this invention is to provide an improved flat coil armature and a method for producing the same. An armature of this invention is preferably produced by winding the armature coils on a preform frame comprising concentric inner and outer ring structures having surfaces over which the coil end turns are engaged. A commutator body is located within the bore of the inner ring structure and has tangs extending therefrom. Appropriate connections of the coil terminal wire portions to the commutator tangs are made before, during, and after the coils are wound. The commutator body is securely mounted within the bore of the inner ring structure and the coils are wound under sufficient tension that the wound assembly (termed an "armature preform") of the preform frame and the commutator have a self-supporting shape. The preform may, accordingly, be handled by automatic materials handling equipment, there being no loose coils or wire leads requiring attention.

Either before or after the preform is wound, the commutator is mounted on an armature shaft and the preform and the shaft located within the cavity of a plastic molding machine, such as an injection molding machine, whereupon the inner and outer ring structures along with the coil wires therebetween are encapsulated in a matrix of resinous material. The matrix of resinous material also encapsulates the commutator tangs and the lead wire connections thereto and surrounds portions of the armature shaft and the commutator body.

An armature made in accordance with this invention has a well defined, thin-walled active coil section with the active coil wires extending along substantially radial paths to maximize the efficiency with which the coils are affected by the magnetic fields within which they operate. The end turns of the coils are coursed over surface portions of the inner and outer rings shaped to retain the inner and outer end turns of each coil separated from one another and from the area of the active coil sections.

Other objects and advantages will become apparent from the following description and the accompanying drawings.

BRIEF DESCRIPTION OF THE DRAWINGS

FIG. 3 is a fragmentary axial, end view of a preform frame and a commutator forming part of the preform of FIG. 2, and showing a first armature coil wound on the preform frame.

FIG. 4 is an axial, end view of the preform frame and a commutator showing the first three coils wound thereon in full lines and the fourth coil in phantom lines.

FIG. 5 is a cross-sectional view of a portion of the armature preform taken along line 5—5 of FIG. 2.

FIG. 6 is a simplified, cross-sectional view of tooling of a plastic injection molding machine with the armature of FIG. 1 shown formed therein.

FIG. 8 is an enlarged, fragmentary, elevational view, partly in cross-section, of a portion of the machine of FIG. 7 with the armature preform frame and the commutator at the winding station.

FIG. 9 is an enlarged, fragmentary, exploded, perspective view of a portion of the machine of FIGS. 7 and 8 and including the preform frame and the commutator.

FIG. 10 is a fragmentary perspective view of the machine, the preform frame, and the commutator as viewed from a point of reference different from that of FIG. 9, and showing the position of parts in readiness to commence the winding of coils and the formation of commutator connections.

FIG. 11 is a fragmentary elevational view of parts of the machine, showing wire shielding and guiding structure by both full and phantom lines, along with a wire clamp and the preform parts, the machine elements and the preform parts being represented in the same position reached in FIG. 10.

FIGS. 12, 14, 16, 18, 20 and 22 are each similar to FIG. 10 and show, in sequence, the steps taken to loop the start wire of the first coil to be wound about a commutator tang in advance of the winding of such first coil.

FIGS. 13, 15, 17, 19, 21 and 23 are each similar to FIG. 11 but show the position of the parts reached in FIGS. 12, 14, 16, 18, 20 and 22, respectively.

FIGS. 24 and 25 are similar to FIGS. 10 and 11, respectively, but show the parts in readiness to wind the first coil on the preform frame.

FIGS. 26 and 27 are views similar to FIGS. 10 and 11, respectively, but show the parts after the winding of the first coil is completed.

DETAILED DESCRIPTION

Figure 1:
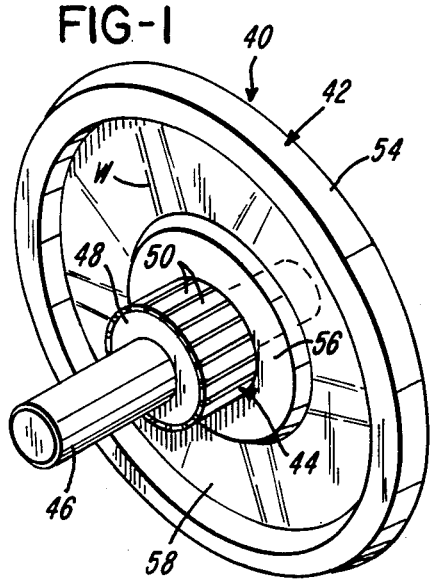
FIG. 1 is a perspective view of an armature made in accordance with this invention.

With reference to FIG. 1, an armature designed for use in a flat disc motor and made in accordance with this invention is generally designated 40, and comprises a discoidal, encapsulated winding 42, a commutator 44, and an armature shaft 46. The armature shaft 46 is designed to engage bearings within the motor housing (not shown), and may be of any conventional construction. The commutator 44 comprises a plurality of circumferentially spaced conductive segments 50 on a cylindrical body of plastic press-fit on the shaft 46. The segments 50 each have means for connection to terminal portions of the several armature coils, such connection means being shown in FIGS. 2 through 6 and comprising commutator tangs 52, there being one tang 52 forming part of each one of the segments 50.

The winding body 42 is of a circular, disc-like configuration, having an outer ring 54, an inner hub 56, and a circular web 58. The hub 56 is formed, as will be described below, so as to be adhered both to a portion of the commutator 44 and to a portion of the armature shaft 46. The construction is such that the encapsulated winding 42 is securely affixed to the commutator 44 and the shaft 46 so that, when in use, rotation imparted to the winding body 42 by the motor field magnets (not shown) will be transmitted directly to the shaft 46.

The encapsulated winding 42 includes plural coils wound from insulated wire, preferably insulated copper wire, which are encapsulated in a resinous material. The resinous material and the wire sections forming the web 58 have a minimal thickness and are so formed that wire strands (as indicated by W in FIG. 1), may be exposed at the surfaces of the web 58. The radial dimensions of the web 58 are determined by the design paramaters of the motor with which the armature 40 is to be used. More specifically, permanent magnet pole pieces in the motor housing (not shown) or the like will be located as close as possible to the web 58 and the radial dimensions of the web 58 are designed to accomodate the dimensions of the pole pieces. The pole pieces typically would be located on one side of the web 58, with steel located on the other side of the web 58, it being desirable in the construction of such motors that the spacing needed to accomodate the web 58 between the pole pieces and the steel or other motor parts be kept to a minimum.

As will be described below, the portions of the armature coils lying within the web 58 are arrayed on lines extending generally radially from the axis of the armature shaft 46, and the portions of the coils located within the outer ring 54 and the hub 56 comprise end turns which are located outside of the ambit or projection of the pole pieces, such end turns extending generally coaxially around the axis of the armature shaft 46.

With reference to FIGS. 2 through 6, the manufacture of the armature 40 may be accomplished entirely automatically by a process wherein coils of wire are wound from a continuous, uninterrupted length of wire onto a preform frame 59. Frame 59 comprises a pair of coaxially oriented and substantially coplanar frame members, namely an inner ring 60, which may be press-fit, hot-welded, molded or otherwise fixedly mounted on the commutator 44, and an outer ring 62 extending circularly around and spaced from the inner ring 60. The inner ring 60 comprises a disc-like, thin-walled toroidal, main body portion 64, the front and rear surfaces of which may be planar and further comprises a plurality of inner coil forming protrusions or lugs 66 projecting forwardly from the main body portion 64. (For convenience, the term "forward" as used herein, refers to the end of the armature where the coils are connected to the commutator tangs 52.) The lugs 66 are preferably in the form of L-shaped fingers or hooks and cooperate with the adjacent forward face of the inner ring 60 to form inner coil end turn receiving channels 68. The outer ring 62 comprises a disc-like, thin-walled toroidal main body portion 69 having planar front and rear surfaces and further comprises plural, substantially radially extending outer coil forming lugs 70 protruding from the main body portion 69. In addition, the outer ring 62 comprises a rearwardly extending annular flange 72 surrounding its bore 62A. For reasons which will appear below, the bore 62A of the main body portion 69 of the outer ring 62 tapers inwardly from front to rear as may be best seen in FIGS. 5 and 8.

Both the inner and the outer rings 60 and 62 may be made from a non-conductive material having sufficient strength, stability, and rigidity to have a self-supporting shape and to withstand the loads applied during and after manufacture. A glass-filled nylon is an example of a material suitable for this purpose. Numerous other thermoset or thermoplastic materials may be used. Materials other than plastic, such as metal having an insulating coating or amorphous materials would also be suitable. For proper operation of the armature 40 it is necessary that the rings 60 and 62 be non-magnetic. A resinous material is preferred because the rings can readily and inexpensively be manufactured in large quantities therefrom.

The outer end turns of each armature coil extend between a pair of circumferentially spaced outer coil forming lugs 70 and the inner end turns extend between a pair of circumferentially spaced inner coil forming lugs 66 with the coil sides which form the active coil portions spanning between the inner and the outer rings 60 and 62. The location of the armature coils on the preform 59 may be best understood with reference to FIGS. 3 and 4, which show a first coil 74 wound on the inner and the outer rings 60 and 62. The first coil 74 has a first active side 74A and a second active side 74B. These lie along lines extending nearly radially from the center axis of the preform frame 59. The coil 74 further includes inner end turns 74C and outer end turns 74D spanning respectively across spaced inner coil forming lugs 66 and outer coil forming lugs 70. Because the outer coil forming lugs 70 project substantially radially in the embodiment illustrated in the drawings, whereas the inner lugs 66 extend generally parallel to the center axis of the frame 59, the coil sides 74A and 74B along with the inner coil end turns 74C lie along the front of the preform frame 59. In contrast, the outer end turns 74D are formed over the outer periphery of the outer ring body 69 alongside the outer coil forming lugs 70 which they engage and then along the backside of the body of the outer ring 62. The mid-portion of the outer end turns 74D stretching along the backside of the outer ring body 69 lie against the outer periphery of the annular flange 72 and are thereby prevented from entering the area occupied by the active coil sides 74A and 74B, i.e., the area of the web 58 of the completed armature. Since the inner end turns 74C overlie inwardly directed surfaces of a pair of inner coil forming lugs 66 and the outer end turns 74D are constrained by the outer coil forming lugs 70 they engage to overlie outwardly directed surface portions of the outer ring body 69, the preform frame 59 effectively constitutes a coil form that determines the shape of the first coil 74 and all subsequent coils wound thereon.

As will be further described below, in the illustrated embodiment, when the winding of the armature 40 is commenced, the start end S of the wire W forming the first coil 74 is wrapped around one of the commutator tangs 52 (such tang being designated 52A in FIGS. 3 and 4) so that the start end S is extended from the selected tang 52A and coursed adjacent one of the inner coil forming lugs 66 and the wire is then wound into the first coil 74.

After the first coil 74 is wound as shown in FIG. 3, the finish wire portion thereof, designated F, is advanced to the commutator tang 52B next adjacent the second active side 74B of the first coil 74, looped around the tang 52B, and the wire then coursed to wind a second coil 76 shown in FIG. 4. The process is repeated then to wind the third coil 78 shown in FIG. 4, and so forth. In the embodiment of the armature shown in the drawings, there are sixteen coils, all sixteen being shown in FIG. 2. The first coil wound is identified in FIG. 2 by its coil sides 74A and 74B, the second coil by its sides 76A and 76B, the third coil by its sides 78A and 78B, the fourth coil wound by its sides 80A and 80B and also by its outer end turns 80D, the fifth by its sides 82A and 82B, the sixth by its sides 84A and 84B, and the seventh by its sides 86A and 86B and also by its outer end turns 86D. The eighth through the fifteenth coils are designated in FIG. 2 respectively by reference numbers 88, 90, 92, 94, 96, 98, 100 and 102, the lead lines to such coils extending from the reference number toward the first coil sides thereof. Finally, the sixteenth coil wound is designated in FIG. 2 by its first coil side 104A and its second coil side 104B. Extending from the last side turn of coil side 104B is a terminal finish wire end T that is looped around the same commutator tang 52B about which the start wire S is looped.

Figure 2:
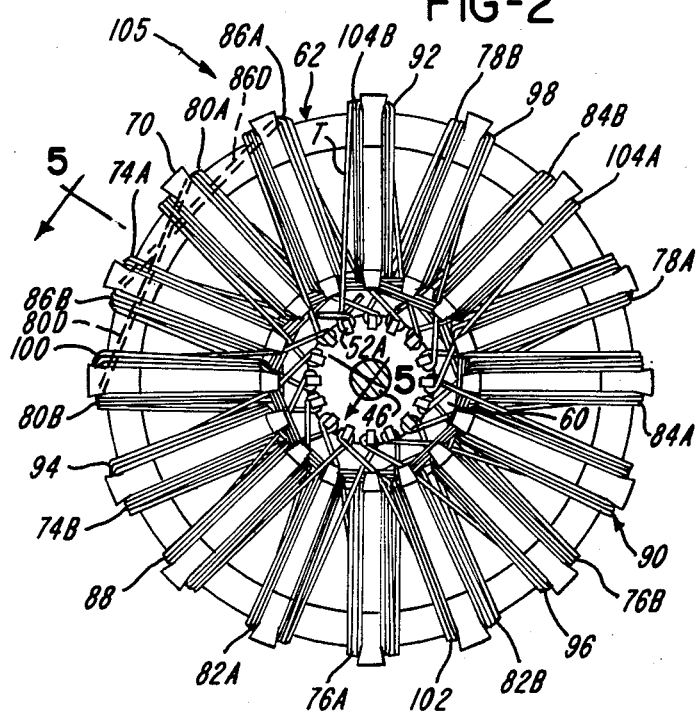
FIG. 2 is an axial, end view of an armature preform and an armature shaft, the preform and the shaft forming part of the armature of FIG. 1.

It may be observed in FIGS. 2, 3 and 4 that there are sixteen commutator tangs 52, sixteen inner coil forming lugs 66, and sixteen outer coil forming lugs 70. However, it is to be understood that other geometries are possible involving greater or lesser numbers of tangs, lugs, and coils. Also, it will be noted in the drawings that each coil spans across three of the inner coil forming lugs 66 and three of the outer coil forming lugs 70 and it will further be observed, as may be appreciated best from a study of FIG. 4, that there is a spacing between subsequently wound pairs of coils of two of both the inner and outer coil forming lugs 66 and 70. Accordingly the coils are effectively wound in layers of three each. Thus it can readily be appreciated, with reference to FIG. 4, that the fourth coil wound, which is shown by phantom lines 80, spans across the first side 74A of the first coil 74. Those familiar with armature windings will recognize the winding pattern is of a type known as retrogressive wave winding. A progressive wave winding could also be accomplished within the purview of this invention, as well as both progressive and retrogressive lap windings. With the wave winding pattern illustrated, it will be observed that the second set or layer of three coils is 1/16th offset in a circumferential direction from the first layer. The same is true for subsequent layers. If there were to be 18 coils, each layer would be 1/18th offset from the adjacent layer and so forth. However, as mentioned above, many other winding patterns and geometries may be produced.

The completed assembly, shown in FIG. 2, of the preform frame 59, the coils 74–104 wound on the frame 59, and the commutator 44, to which the coil terminal wires are connected is termed an "armature preform" herein and is referred to generally by reference number 105. The coils are relatively tightly wound with as many turns per coil as dictated by the performance requirements of the motor with which the armature is to be used.

With reference to FIG. 5, a portion of the fully wound preform 105 and the armature shaft 46 are shown in cross-section. The first wound side 74A of the first wound coil 74 is illustrated in FIG. 5, such coil side being shown to be flush against the forward surfaces of both the inner and outer rings 60 and 62. Parts of the fourth wound coil 80 span over the coil side 74A as mentioned above and are therefore visible in FIG. 5, these being parts that constitute, respectively, the inner and outer end turns. Inner and outer end turns of the seventh wound coil 86, appear in FIG. 5, these parts being coursed around the same inner and outer coil forming lugs 66 and 70 illustrated in FIG. 5 that are engaged by the first coil end turns 74C and 74D. Also shown in FIG. 5, looped about the tang 52 illustrated therein, is a wire loop 106 that interconnects the second side of coil 92 with the first side of coil 94. (Coils 92 and 94 are not shown in FIG. 5.)

It can be appreciated by an inspection of FIGS. 2 through 5 that the completed preform 105 has a circular array of tightly wound coils each of which tends to pull the inner ring 60 toward the outer ring 62. When winding devices having an even number of slots and coils, each coil is diametrically opposed to an essentially identical coil tending to pull the inner ring 60 in the opposite direction. Accordingly, the coil sides spanning between the inner and outer rings 60 and 62 are under tension and function mechanically somewhat like the spokes of a conventional bicycle wheel to hold the inner ring 60 and the outer ring 62 together and to resist relative movements of any kind therebetween. The same result will also obtain in those cases in which the device has an odd number of slots and coils or other configuration wherein each coil will be substantially, but not precisely, diametrically opposed by an essentially identical coil. For this reason, the fully wound preform has a substantially self-supporting shape and can be moved about or manipulated by mechanical devices as if it were a solid, one-piece part, there being no loose or highly flexible parts requiring special or separate handling.

After the winding of the preform 105, fusing or hot-staking of each of the commutator tangs 52 is performed, as is conventionally done after the winding of other types of armatures having commutators with tangs. By such process, the free ends of the tangs 52 are bent, and thereby folded upon the wire portions looped therearound, from their positions almost parallel to the axis of the preform 105, such condition being shown by phantom lines in FIG. 5, to positions wherein they are essentially perpendicular to such axis using an electrode that electrically heats the tangs and vaporizes the wire insulation, thereby insuring both secure electrical and secure mechanical connections to be made. Also, after the winding of the preform 105, the armature shaft 46 is press-fit within the bore of the commutator 44.

After processing as described above, the preform 105 and the armature shaft 46 can be placed in an appropriate plastic molding machine, such as an injection or a compression molding machine, to encapsulate the windings as well as the inner and outer rings 60 and 62 in a matrix of molded resinous material which serves also to bond the various parts of the preform and the armature shaft together. One such operation is illustrated in FIG. 6 wherein the preform 105 is shown positioned in an appropriately shaped cavity formed in confronting mold members 110 and 112. Molten plastic has been injected, using techniques that may be entirely conventional, into the mold cavity to form a pressure-shaped molded resinous matrix 114 that covers, and is effectively integral with, the inner and outer rings 60 and 62 to form therewith, and with the coil portions supported thereby, the rear portion of the armature hub portion 56 and the entire outer margin 54 of the completed armature 40. The web 58 is similarly formed by an encapsulation of the coil side turns in the molded matrix 114. The forward part of the hub portion 56 is formed by the molten resin, which serves to encapsulate the inner coil forming lugs 66, the wire portions extending therearound, and also the tangs 52 and the wire parts that loop therearound. The resinous material used to form the molded matrix 114 may comprise any one of numerous available thermoset or thermoplastic materials. Polyethylene terephthalate (PET) is an example of a suitable material.

The molding operation may occur using various different processes with the advantage that the parts of the preform 105, because they are self-supporting and of a substantially rigid configuration, can simply be placed into the mold cavity either by hand or by automatically operating machinery. As a preliminary to the molding operation, one may optionally flatten the coil sides because of the desirability of having the web 58 of absolute minimum thickness.

Figure 7:
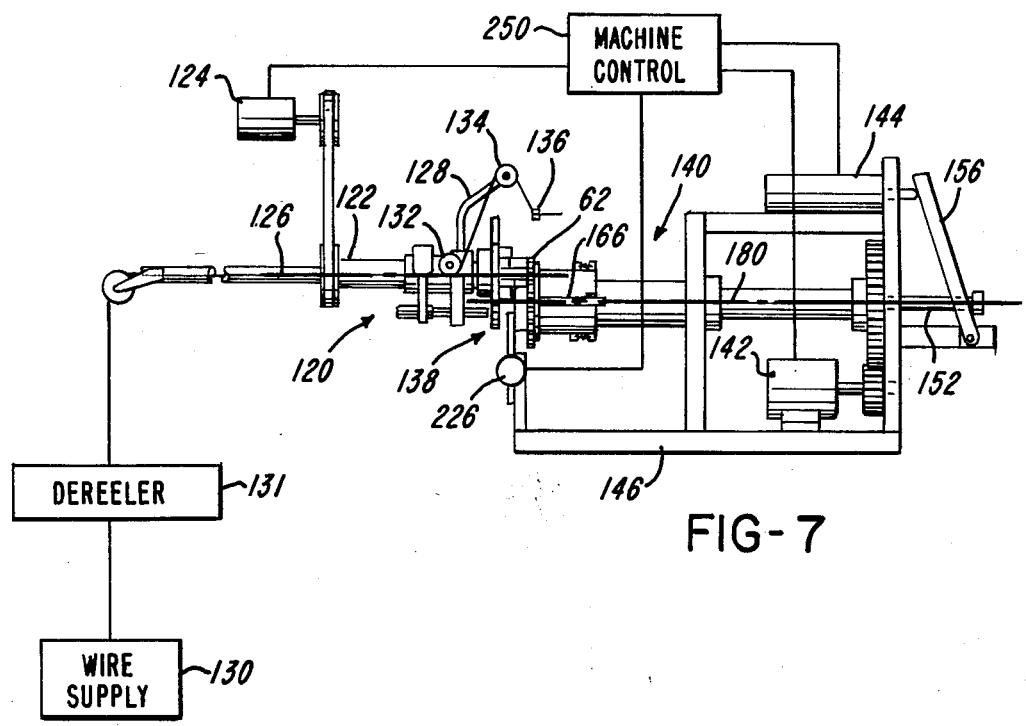
FIG. 7 is a simplified diagrammatic and schematic view of an armature winding machine in accordance with this invention used to wind coils and form commutator connections to the coils to produce the armature preform of FIG. 2, and illustrating the armature preform frame at the winding station of the machine.

Apparatus for winding the coils and forming the commutator connections is illustrated in FIGS. 7 through 27. FIG. 7 is a simplified, somewhat diagrammatic and schematic view of the machine which is generally designated 120.

The winding machine 120 has a flier spindle 122 driven by a motor 124 for rotation about a flier axis 126. A flier 128 is mounted on the spindle 122 for rotation therewith. Wire from a suitable source of wire 130 placed under tension by dereeler 131, which may be entirely conventional, is coursed through the spindle 122 and outwardly therefrom around a wire exit pulley 132 adjacent to the flier 128 and a flier pulley 134 at the free end of the flier 128. The wire W may be held by a clamp 136 which may be associated with a cutter mechanism (not shown) for severing the wire portions between the winding of subsequently wound armatures. Those familiar with flier type armature winding machines will recognize that the structure as thus far described in FIG. 7 may be entirely conventional, various types of flier-type winding machines being well known. For this reason the flier drive is not described in further detail herein.

The machine 120 illustrated in FIG. 7 further includes a winding form assembly 138, that will be further described below, and a preform clamp and rotator assembly, generally designated 140. The preform clamp and rotator assembly 140 holds the inner and outer rings 60 and 62 in relatively fixed coaxial, substantially coplanar, and rotational positions, only the outer ring 62 being visible in FIG. 7.

The clamp and rotator assembly 140 includes a drive motor 142 and a clamp release cylinder 144 which, together with the remainder of the assembly 140 are mounted on a frame 146 which can be affixed to the bed of the machine (not shown).

With continued reference to FIG. 7, and also with reference to FIGS. 8 and 9, the commutator 44 is shown clamped by a split collet 148 which is held in clamping relation thereto by a spring washer assembly 150 surrounding a collet operating shaft 152 and biasing a collet operating ram 154 affixed to the end of the collet operating shaft 152 to the left as shown in FIG. 8 so that the split collet 148 grippingly engages the commutator 44. It will be noted in FIGS. 7 and 8 that a collet operating lever 156 may be driven by the clamp release cylinder 144 so as to overcome the bias of the spring washer assembly 150 and thereby cause the collet operating ram 154 to be moved to the right as shown in FIG. 8, whereupon the gripping pressure exerted by the collet 148 upon the commutator 44 will be reduced so as to permit insertion or removal of the commutator.

The collet operating ram 154 cooperates, as is obvious, with a collet cam 158 to cause the collet 148 to grip the commutator. The collet cam 158 forms part of a collet housing 160 which has on its forward face 161, i.e. the face confronting the winding form assembly 138, a forwardly extending projection or key 162 adapted to fit within a notch 164 in the rear face of the inner ring 60 (see FIG. 9) for purposes of holding the inner ring 60 in a predetermined rotary relationship relative to the outer ring 62 as will be made more apparent below.

The housing 160 is generally tubular and has four slots 166 spaced equally therearound within which are located clamp levers 168 mounted for pivotal movement on the housing 160 by pivot pins 170 and which are formed at their outer ends to innerfit within the bore of the outer ring 62. Three of the levers 168 are formed so as to snugly mate with and clamp against the tapered inner bore surface 62A of the outer ring 62. The fourth arm 168 is formed with a projection or key 172 for engaging a cooperating notch 174 (see FIG. 9) in the bore 62A of the outer ring 62 so that the outer ring 62 is held in a predetermined rotary position relative to the four clamp levers 168. The levers 168 are each biased by springs 176 connected thereto and to the housing 160 so that the free ends of the levers 168, i.e., those ends designed to engage the bore 62A, are biased outwardly to securely hold the outer ring 62. At such time as the collet release cylinder 144 is energized to release the grip on the commutator 44, the outer ring clamp levers 168 are caused to be pivoted inwardly of the bore 62A and become disengaged from the outer ring 62 by virtue of engagement of the margins of a groove 178 encircling the collet ram 154 with pawl-like, radially inwardly projecting lugs 169 forming parts of the levers 168.

The collet mechanism described above, including the collet 148, the collet ram 154, the housing 160, and the levers 168 are all rotatable about a collet axis 180 (see FIG. 7) coincident with the axis of the commutator 44 and the preform frame 59. In FIG. 7, the collet axis 180 is shown parallel to and offset from the flier axis 126 (as it would appear in a plan view), a condition necessary to enable the coils to be successively wound about axes which are offset from the axis of the preform frame 59. As will be described below, the collet parts are caused to rotate by the clamp and rotator assembly drive motor 142 through a repeating series of steps to effect connection of the wire W to the commutator tangs and to wind the coils.

Referring to FIGS. 8 and 9, the winding form assembly 138 includes a winding form 190 which, as conventional, is mounted by a bearing located within a housing 192 on the end of the flier spindle 122 and includes a pair of winding form support plates 194 and 196 on which is supported a form mounting block 197 on which wire guide plates 198, 206, and 214, to be described below, are mounted. The winding form 190 includes an outer wire guide plate 198 which has a concavely curved surface 200 adapted to shield a portion of the outer ring 62 to prevent the wire sliding along the plate 198 from engaging the outer ring 62. Adjacent curved surface 200, the outer guide plate 198 has sloping lower and upper wire guide edge surfaces 202 and 204, respectively, for guiding the wire around the outer coil forming lugs 70 across which extend the outer end turns of the coil to be wound.

The winding form 190 further includes an inner wire guide plate 206 having sloping lower and upper wire guide edge surfaces 208 and 210, respectively, for guiding the wire around the inner coil forming lugs 66 across which the inner end turns of the coil extend. The center portion of the face of the inner guide plate 206 has a recess 212 designed to provide a pocket for the inner coil forming lugs 66 across which the inner end turns of the coil extend and is provided with an arcuate wire guide lip 213 designed to be located between the pocketed lugs 66 and the adjacent commutator tangs 52. As the flier 128 rotates during the winding of a coil to draw wire across the inner guide plate 206, the wire slides along the surface 208 and, as it enters the recess 212, engages along one side of one of the inner coil forming lugs 66 and is then forced by the arcuate wire guide lip 213 into the inner end turn receiving channels 68 shown in FIG. 5. As the flier 128 continues to rotate, the wire is guided by the upper edge guide surface 210 to the other one of the inner coil forming lugs 66 which it engages. The outer wire guide plate 198 is spaced from the inner wire guide plate 206 by an intermediate guide plate 214 having a polished, planar guide surface 215 provided to closely confine the coil side turns adjacent the front surface of the rings 60 and 62 as the winding progresses.

Referring to FIGS. 7, 9, and 10, an inner pin and commutator shield assembly 216 is provided to prevent the wire from engaging the commutator tangs or the wrong inner coil forming lugs 66. The assembly 216 includes an inner pin and commutator shield plate 218 to which is rigidly attached a positioning arm 220 that is pivotally supported by a clevis 222 at the end of a drive rod 224 of an inner pin and commutator shield positioning air actuator 226. The end of the positioning arm 220 remote from the shield plate 218 has a guide pin 228 that rides in an arcuate guide slot 230 in a guide plate 232.

The inner pin and commutator shield plate 218 has a recess 234 shown in FIG. 9 for receiving selected ones of the inner coil forming lugs 66 and the commutator tangs, the recess being located in the face of the shield confronting the preform frame 59. The shield 218 is selectively located in either one of two positions, namely an extended position and a retracted position. FIG. 27 shows in full lines the extended position which the shield plate 218 occupies during the time a coil is being wound. There it will be noted that the shield plate 218 overlies a sufficiently large portion of the front face of the inner ring 60 that only three of the inner coil forming lugs 66 are fully exposed, these being the same three pins pocketed by the central recess 212 of the inner guide plate 206. The shield plate 218, accordingly, shields all of the other inner coil forming lugs 66 as well as all of the commutator tangs 52 during the winding of a coil and thereby prevents the wire from hooking any portion of the inner ring 60 but for the lugs 66 about which the inner coil end turns are being formed. The face of the shield plate 218 opposite the face confronting the inner ring 60 is concavely contoured as needed to permit the wire to enter the center recess 212 of the inner guide plate 206 as the flier 128 rotates to wind a coil. The free end edge, designated 236, of the shield plate 218 is also contoured to assist in guiding the wire into the channels 68. In FIGS. 26 and 27 it can be seen that, in the extended position of the shield plate 218, its free end edge 236 is located closely adjacent to the inner wire guide plate 206. In the retracted position of the shield plate 218, shown in FIGS. 10 through 23 and in phantom lines in FIGS. 26 and 27, it is moved horizontally away from the inner guide plate 206 and is also pivoted in a counterclockwise direction, as viewed therein, for reasons which will become apparent.

FIGS. 10 through 27 show in sequence the manner in which the apparatus of this invention operates to wind the preform shown in FIG. 2. First, it may be noted that FIG. 11 shows the same position of the parts that are illustrated in FIG. 10. The same scheme is followed throughout the remaining FIGS. 12 through 27, with the odd numbered figures illustrating the parts in the same position as the immediately preceeding figure. Also, the odd numbered figures beginning with FIG. 11 illustrate the winding form assembly 190 by phantom lines 190A. The margins of the winding form guide surfaces that cooperate with the inner ring 60 and the outer ring 62 to determine the shape of the coils are indicated by phantom lines 190B.

In general, FIGS. 10 through 23 illustrate a sequence of steps that may be taken to loop the start wire end S around its associated tang 52A in preparation for the winding of the first coil 74. FIGS. 24 and 25 illustrate the position of parts at the commencement of the winding of the first coil 74 and FIGS. 26 and 27 show the position of the parts at the end of the winding of the first coil 74. After the parts have reached the position shown in FIG. 27, the sequence of steps shown in FIGS. 14 through 27 are repeated for each coil to be wound. The looping of the wire portions about the tangs 52 is accomplished by a series of rotary movements of both the flier 128 and the preform assembly of the rings 60 and 62 and the commutator 44. During the looping operation, the shield plate 218 is located in its retracted position to enable the wire to be guided by the inner guide plate 206 along the side of the tang 52A around which it is to be looped, as is illustrated in FIGS. 12 and 13. To enable the rotary positions of the preform assembly to be quickly grasped, the key 172 engaging in the outer ring notch 174 is marked with hatch lines in the odd numbered figures beginning with FIG. 11, and it should be recognized that the hatch lines do not in this case represent that the part is shown in cross-section.

Those familiar with flier-type armature winding machines will appreciate that the process for winding the armature preform and making the appropriate connections to the commutator tangs is related to procedures disclosed in U.S. Pat. Nos. Re. 27,893 and 3,705,459, and will be able to comprehend the winding and tang looping procedures by studying FIGS. 3, 4, and 10 through 27 herein. At the commencement of the tang looping and coil winding process, the inner and outer rings 60 and 62 along with the commutator 44 are clamped in the position shown in FIGS. 10 and 11 and the free end of the wire W is held by the wire clamp 136. The looping of the start wire S around a tang 52 is begun by rotation of the flier in a "forward" direction, which is the same direction in which the flier is rotated to wind the coils. This is counterclockwise or "topgoing" as viewed in FIGS. 10 and 12. The wire W is thereby extended alongside the outer coil forming pin designated 70A in FIG. 13 and also alongside the commutator tang 52A around which the start wire portion S is to be looped. The preform 105 is then rotated in a clockwise direction, as indicated by the arrow 242 in FIGS. 14 and 15, through an angle of slightly less than 90 degrees. During this rotary movement of the preform 105, the section of wire extending from the tang 52A to the flier pulley 134 is prevented by the shield plate 218 from hooking any of the tangs other than tang 52A. At the same time, the outer coil forming lug 70A moves out of engagement with the wire W, so that the length of the section of the wire W between the clamp 136 and the flier pulley 134 is shortened. Those familiar with armature winding machines will recognize that the dereeler 131 may be used to substantially remove the slack wire condition that would result from the shortening of such wire section.

After the clockwise rotation of the preform frame 59 shown in FIGS. 14 and 15, the flier is rotated further in the forward direction as indicated by the arrows in FIGS. 16 and 17 through an angle of approximately 60 degrees in order to more securely hook the wire on the tang 52A. The wire is then looped around the tang 52A by rotating the preform frame 59 in a clockwise direction, as indicated by the arrows in FIGS. 18 and 19, through an additional angle on the order of 50 to 60 degrees which causes the tang 52A to move under the shield plate 218. The section of the wire W between the tang 52A and the flier pulley and also the section of wire between the flier pulley 134 and the tang 52A extend over the end edge of the tang shield plate 218 and the wire is almost completely looped around the tang 52A.

After the parts have reached their positions shown in FIGS. 18 and 19, the flier is again rotated in its forward direction through approximately 60 degrees to complete the looping of the wire about the tang 52A as shown in FIGS. 20 and 21. During the increment of flier rotation between the positions of parts illustrated in FIGS. 18 and 19 and the positions illustrated in FIGS. 20 and 21, the stretch of wire between the tang 52A and the flier pulley 134 begins sliding along the upper wire guide surface 210 of the inner guide plate 206 so that the wire is guided to a position wherein it partly lies between the inner ring lug 66 next adjacent the tang 52A and the next adjacent counterclockwise inner ring lug 66. Accordingly, the preform 105 may then be further rotated to the position shown in FIGS. 22 and 23 to bring the lug 66A into engagement with such stretch of wire whereupon the preform parts and the flier are positioned to initiate the winding of the first coil 74. At or before the commencement of the winding of the first coil, the shield actuator 226 is energized to move the tang shield plate 218 into its maximum shielding or extended position shown in FIGS. 24 and 25. Thus, the shield plate 218 is pivoted in the clockwise direction and translated horizontally toward the winding form assembly 190. The flier may then be rotated in its forward direction to wind the first coil 74. During the winding operation, the wire is prevented from engaging the commutator tangs and all but the intended inner ring lugs 66 by the shield plate 218.

During the winding of the first coil 74, the section of wire between the commutator tang 52A and the clamp 136 is severed. This is preferably done immediately adjacent the tang 52A and may be accomplished in various ways. The presently preferred method would be to cause the wire to be severed against the edge of the tang by abruptly moving the clamp 136 away from the commutator 44 clamped in the winding station by the clamp and rotator assembly 140. This method is described in U.S. Pat. No. 3,812,577, and a further discussion of the method or of apparatus for accomplishing the same is deemed unnecessary.

A comparison of FIG. 27, showing the first coil 74 fully wound, and FIG. 13, reveals that the stretch of wire leading to the flier is in approximately the same orientation and that it leads to the flier from an outer coil forming pin 70 shown in FIG. 27 that is in the same position as the outer coil forming lug 70A about which the lead wire was hooked in the position shown in FIG. 12. Accordingly, the parts are in position when the winding of the first coil is completed to initiate the looping of the terminal end of the first coil 74 about the next adjacent tang 52B. The first step is to return the tang shield plate to its upper and outer or retracted position, as is indicated by phantom lines in FIGS. 26 and 27, to expose the tang 52B for engagement by the wire. The sequence of steps illustrated and described in connection with FIGS. 14 through 27 are then repeated to accomplish the complete looping of the wire around the tang 52B and the winding of the second coil 76. These same steps are then repeated throughout the winding of the armature until all sixteen coils are wound.

At the end of the winding operation, the finish wire T of the last wound coil 104 is looped around the same tang 52A about which the start wire S was looped by a repetition of the steps illustrated and described in connection with FIGS. 14 through 23. The next step is to sever the wire between the flier pulley and the wound armature. Again, this may be accomplished in known ways, the method described in U.S. Pat. No. 3,812,577 being preferred for this purpose.

Those familiar with the art of armature winding will recognize that the aforedescribed steps for winding the armature may be varied for different armature configurations. Some of the steps may not be needed for certain armature configurations, while others may require additional steps.

The operation of the machine 120 is controlled by machine control circuitry, schematically illustrated at 250 in FIG. 7, by which the motors 124 and 142 and the actuators 142 and 226 are selectvely energized to perform their functions in proper sequence. Those familiar with flier-type armature winding machines will recognize that control circuitry used for armature rotators, such as that shown in U.S. Pat. No. 3,673,878, may be used for controlling the clamp and rotator assembly drive motor 142. More recently developed electronic controlled rotators, which are well known and widely used in the art, could also be used. Electronic controls for operating fliers are also well known in the industry; U.S. Pat. No. 4,163,931, discloses one form of circuitry for this purpose. Because the machine control 250 could take various forms and may be old and well known, it is not further illustrated or described herein.

The preform 105 described above includes the commutator 44. Such is preferred in the case of armature winding because all of the commutator connection steps are performed entirely automatically as the winding progresses. The preform 105 does not include the armature shaft 46 although it could optionally be mounted in place before the armature is wound. It clearly is an advantage to have the armature shaft 46 in place when the resinous material is molded so such material will be engaged with the shaft 46 as shown in FIGS. 1 and 6.

Although the preferred embodiment of the present invention has been described, it will be understood that various changes may be made within the scope of the appended claims.

We claim:

1. A flat coil dynamoelectric device comprising a substantially rigid preform having an integral outer frame structure having a central bore, a self-supporting shape, and being substantially symmetrical about a center axis; an integral inner frame structure having a central bore and being substantially symmetrical about said center axis located within said central bore of said outer frame structure and having a self-supporting shape; plural coils of wire forming a complete set of coils for said device wound on said frame structures, said coils having sides spanning between said frame structures and end turns extending generally along said frame structures, said frame structures of said preform being held in mutually spaced relation by said coils, and a matrix of resinous material encapsulating said preform.

2. The device of claim 1 wherein said device comprises an armature, said inner and outer frame structures comprise inner and outer ring structures, respectively, and said device further includes a commutator in the bore of said inner ring structure.

3. The armature of claim 2 wherein said inner and outer ring structures each have lugs around which said coils are wound.

4. A flat coil armature comprising a preform having an outer frame structure having a self-supporting shape and being substantially symmetrical about a center axis, an inner frame structure substantially symmetrical about said center axis located within and substantially coplanar with said outer frame structure and having a self-supporting shape, plural coils of wore wound on said frame structures, said coils having sides spanning between said frame structures and end turns extending generally along said frame structures, said inner and outer frame structures comprising inner and outer ring structures, respectively, each having lugs around which said coils are wound, said outer ring structure having a circular flange engaged by the outer end turns of said coils and preventing said outer end turns from entering the area between said ring structures, a matrix of resinous material encapsulating said frame structures and said coils, and a commutator in the bore of said inner ring structure.

5. The armature of claim 3 wherein said lugs on said outer ring structure project outwardly from said outer ring structure with respect to the axis of said ring structures.

6. A flat coil armature comprising a preform having an outer frame structure having a self-supporting shape and being substantially symmetrical about a center axis, an inner frame structure substantially symmetrical about said center axis located within and substantially coplanar with said outer frame structure and having a self-supporting shape, plural coils of wire wound on said frame structures, said coils having sides spanning between said frame structures and end turns extending generally along said frame structures, said inner and outer frame structures comprising inner and outer ring structures, respectively, each having lugs around which said coils are wound, said lugs on said outer ring structure projecting outwardly from said outer ring structures with respect to the axis of said ring structures, said lugs on said inner ring structure including surface portions facing generally toward said axis, said coils being wound from turns of wire coursed around a pair of said lugs on said outer ring structure and said surface portions of a pair of said lugs on said inner ring structure, a matrix of resinous material encapsulating said frame structures and said coils, and a commutator in the bore of said inner ring structure.

7. The armature of claim 6 wherein said outer end turns are formed around the outer margin of said outer ring structure and hook over spaced pairs of said lugs projecting therefrom.

8. The armature of claim 6 wherein said lugs on said inner ring structure are hook-shaped and form with the adjacent face of said inner ring structure wire-receiving grooves, and wherein said inner end turns are located substantially within said grooves.

9. The armature of claim 8 wherein said outer end turns are formed around the outer margin of said outer ring and hook over spaced pairs of said lugs projecting therefrom.

10. The armature of claim 2 wherein said ring structures each comprise generally circular, thin-walled body members.

11. The armature of claim 10 wherein said ring structures have substantially coplanar forwardly facing surfaces and said coil sides overlie and span between said forwardly facing surfaces.

12. A flat coil armature comprising a preform having an outer frame structure having a self-supporting shape and bieng substantially symmetrical about a center axis, an inner frame structure substantially symmetrical about said center axis located within and substantially coplanar with said outer frame structure and having a self-supporting shape, plural coils of wire wound on said frame structures, said coils having sides spanning between said frame structures and end turns extending generally along said frame structures, said inner and outer frame structures comprising inner and outer ring structures, respectively, said ring structures each comprising generally circular, thin-walled body members, said ring structures having substantially coplanar forwardly facing surfaces, said coil sides overlying and spanning between said forwardly facing surfaces with said inner end turns extending along said forwardly facing surface of said inner ring structure a matrix of resinous material encapsulating said frame structures and said coils, and a commutator in the bore of said inner ring structure.

13. The armature of claim 12 wherein said outer end turns extend over the outer periphery and along the backside of said outer ring structure.

14. The armature of claim 13 wherein said outer ring structure has a rearwardly extending circular flange engaged by the outer end turns of said coils and preventing said outer end turns from entering the area between said ring structures.

15. The armature of claim 14 wherein said coils are wound under tension so that each coil exerts a force tending to pull said rings toward one another.

16. The armature of claim 15 wherein for each of said coils there is a substantially diametrically opposed one of said coils tending to pull said rings together in the opposite direction.

17. The armature of claim 2 wherein said coils are wound under tension so that each of said coils tends to pull said rings toward one another.

18. The armature of claim 17 wherein for each of said coils there is a substantially diametrically opposed one of said coils tending to pull said rings together in the opposite direction.

19. A substantially rigid preform for a flat coil dynamoelectric device comprising an integral ccouter frame structure having a central bore, a self-supporting shape, and being substantially symmetrical about a center axis, an integral inner frame structure having a central bore, substantially symmetrical about said center axis located within the central bore of said outer frame structure and having a self-supporting shape, and plural coils of wire forming a complete set of coils for said device wound on said frame structures, said coils having sides spanning between said frame structures and end turns extending generally along said frame structures, said frame structures being held in mutually spaced relation solely by said coils.

20. The preform of claim 19 wherein said inner and outer frame structures each have lugs around which said coils are wound.

21. The preform of claim 19 further including a commutator in the bore of said inner frame structure.

22. The preform of claim 19 wherein said frame structures have substantially coplanar forwardly facing surfaces and said coil sides overlie and span between said forwardly facing surfaces.

23. The preform of claim 22 further including a commutator in the bore of said inner frame structure.

* * * * *

UNITED STATES PATENT AND TRADEMARK OFFICE
CERTIFICATE OF CORRECTION

PATENT NO. : 4,677,334
DATED : June 30, 1987
INVENTOR(S) : Hyman B. Finegold and Patrick A. Dolgas It is certified that error appears in the above-identified patent and that said Letters Patent is hereby corrected as shown below:

In the Abstract, line 21, "structures." should be --structures, respectively.--. Column 1, line 14, "thin walled" should be --thin-walled--. Column 4, line 17, "where" should be --whereat--; column 4, line 21, "turn receiving" should be --turn-receiving--. Column 6, line 42, "coils each" should be --coils, each--. Column 12, line 67, "selectvely" should be --selectively--. Column 13, line 58, "wore" should be --wire--. Column 16, line 2, "ccouter" should be --outer--.

Signed and Sealed this

Third Day of March, 1992

Attest:

HARRY F. MANBECK, JR.

*Attesting Officer*　　*Commissioner of Patents and Trademarks*